(12) United States Patent
Bucholz et al.

(10) Patent No.: US 6,776,064 B2
(45) Date of Patent: Aug. 17, 2004

(54) DOUBLE FLANK WORM GEAR MECHANISM

(75) Inventors: Thomas J. Bucholz, Sanford, MI (US); David E. King, Freeland, MI (US); Thomas A Barrett, Bridgeport, MI (US); Sergio Retamero, Jerez de la Fra. (ES); Kevin Patrick Moore, Bay City, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/728,244

(22) Filed: Dec. 1, 2000

(65) Prior Publication Data

US 2001/0029800 A1 Oct. 18, 2001

Related U.S. Application Data

(60) Provisional application No. 60/168,369, filed on Dec. 1, 1999.

(51) Int. Cl.$^7$ .............................. F16H 57/12; F16H 1/16
(52) U.S. Cl. ............................. 74/425; 74/409; 74/458
(58) Field of Search ......................... 74/409, 425, 440, 74/458, DIG. 10

(56) References Cited

U.S. PATENT DOCUMENTS

| | | | | |
|---|---|---|---|---|
| 1,440,907 A | * | 1/1923 | Brown .......................... | 74/458 |
| 2,069,433 A | | 2/1937 | Wildhaber ..................... | 74/402 |
| 2,669,128 A | | 2/1954 | Steiner | |
| 2,760,381 A | | 8/1956 | Pickles | |
| 2,764,034 A | * | 9/1956 | Hotine .......................... | 74/440 |
| 2,935,887 A | | 5/1960 | Wildhaber ..................... | 74/458 |
| 3,122,938 A | | 3/1964 | Visser | |
| 3,176,534 A | | 4/1965 | Rice et al. ...................... | 74/425 |
| 3,386,305 A | | 6/1968 | Wildhaber ..................... | 74/425 |
| 3,472,092 A | * | 10/1969 | Doolittle et al. .............. | 74/440 |
| 4,047,449 A | * | 9/1977 | Popov ........................... | 74/425 |
| 4,541,296 A | | 9/1985 | Oyafuso | |

OTHER PUBLICATIONS

European Search Report Dated Jun. 10, 2003.
18 Ways to Control Backlash in Gearing, Oct. 26, 1959, Fredrick T. Gutmann, Product Engineering, pp. 71–75.
Geardrive Systems, Marcel Dekker, Inc New York and Basel, Peter Lynwander, pp. 22–27.
Dudley's Gear Handbook, Dennis P. Townsend, Editor in Chief, Second Edition Chapter 2, Chapter 4; McGraw–Hill Inc. pp. 2.40–2.45 and 4.58–4.63.
Buckingham, E., Analytical Mechanics of Gears,Dover Publications, Inc. (NY 1949) p. 1–77.

* cited by examiner

*Primary Examiner*—William C. Joyce
(74) *Attorney, Agent, or Firm*—Michael D. Smith

(57) ABSTRACT

A worm/worm gear assembly comprises a worm having teeth defined by at least one thread disposed thereon and a worm gear having teeth protruding from a surface thereof. At least one of the worm and the worm gear is fabricated from a resilient material. The teeth of the worm and the teeth of the worm gear are interengaged and in a compressive relationship with each other to maintain double flank contact therebetween. At low- or no-load conditions, the double flank contact is made at the opposing outer edges of each of the teeth. At moderate-load conditions, the contact extends from the opposing outer edges of each of the teeth toward the center of each of the teeth. A method for delashing a gear system comprises disposing the worm in mechanical communication with the worm gear and loading the worm gear to cause the worm gear to compressively engage the worm.

32 Claims, 4 Drawing Sheets

DOUBLE FLANK WORM GEAR MECHANISM

CROSS REFERENCE TO RELATED APPLICATION

This application claims the benefit of U.S. Provisional Patent Application No. 60/168,369, filed Dec. 1, 1999, the content of which is incorporated herein by reference in its entirety.

TECHNICAL FIELD

This disclosure relates to the delashing of worm gear assemblies, and, more particularly, to the delashing of a worm/worm gear assembly through the use of double flank contact maintained between a worm gear and a worm.

BACKGROUND

Gear assemblies typically comprise a drivable gear (e.g., a worm gear) engaged by a pinion (e.g., a worm). In order to permit relative motion between the drivable gear and the pinion, a clearance should be maintained between the teeth of the drivable gear and the teeth of the pinion when the two gears are engaged. This clearance is known as backlash. In a gear assembly with no backlash, the meshing of the teeth between the gears will be so tight that, absent any deflection of the teeth, the gears will bind and cause the gear assembly to jam. In a gear system with any degree of backlash, however, an audible noise is produced by the movement of the teeth of one gear through applicable backlash and into contact with the teeth of the other gear.

In a worm/worm gear assembly, a worm gear is engaged and driven by a worm. Both worm gears and worms are typically fabricated from metal and are configured such that the teeth of the worm are aligned with the spaces defined by the teeth of the worm gear. The teeth of the worm are usually aligned with spaces defined by the teeth of the worm gear such that clearance exists in the meshing of the teeth of each gear. Furthermore, because of the inflexibility of the metallic teeth, the planar surfaces of the flanks, and the need to maintain the clearance, one flank surface of each tooth of the pinion engages one flank surface of each tooth of the driven gear to result in single flank contact. Systems using single flank contact typically employ a contact area uniformly distributed across the surfaces of the engaged flanks. The uniformly distributed contact area, in conjunction with the clearance between the engaged teeth, is a factor that contributes to the audible noise produced during the driving of the worm gear by the worm, particularly during periods when the rotational direction of the worm is reversed to reverse the direction of rotation of the worm gear. Such noise, although not indicative of a defect in the worm/worm gear assembly, generally proves to be undesirable, especially when the worm/worm gear assembly is located within the passenger compartment of a motor vehicle.

The reduction of backlash and the minimization of noise have been achieved in the related art through the use of split gears, which typically comprise two gear halves mounted side-by-side and wherein each gear half includes a plurality of teeth. A spring is positioned between each gear half to bias each gear half in opposing rotational directions. The opposing rotational directions cause flank surface contact to be maintained between a tooth on one of the gear halves and a tooth of a gear with which the split gear is in contact while simultaneously causing flank surface contact to be maintained between the aligned tooth on the other of the gear halves and an opposing flank surface of the tooth of the gear with which the split gear is in contact. Such a structure allows for double flank surface contact to be maintained between successive teeth in a gear set, which reduces or eliminates backlash in the gear set, thereby minimizing noise. However, because of the tension on the spring, both the contact force and the size of the contact area maintained by the teeth of the split gear on the successive teeth of the gear with which the split gear is in contact remain constant regardless of the load imposed on the gear set. Constant force and contact area size cause the contact pressure to vary, which thereby causes constant frictional forces to be experienced by the gear flank surfaces as the load varies. Such constant frictional forces in turn cause a constant degradation of performance within the gear set.

SUMMARY

A worm/worm gear assembly comprises a metal worm and a worm gear fabricated from a resilient material. The worm and the worm gear are maintained in compressive engagement such that double flank contact is maintained therebetween in low- and no-load conditions. One use of such an assembly is to provide torque assist at the steering column of a steering assist system of a motor vehicle. The torque assist is effectuated using a drive motor and a hand steering device maintained in mechanical communication with the worm/worm gear assembly. The hand steering device, through which operator inputs are received by the steering assist system, is typically a hand steering wheel. The operator inputs are sensed through torque and position sensors in electronic communication with the steering assist system. The proper amount of torque assist is then applied to the worm/worm gear assembly through the drive motor to assist in the rotation of the steering column.

The worm/worm gear assembly comprises a worm having teeth defined by at least one thread disposed thereon and a worm gear having flexible and uninterrupted teeth protruding from a surface thereof. The worm and the worm gear are interengaged and in a compressive relationship with each other such that opposing flanks of the teeth of each interengage. Opposing flanks of each tooth are typically arcuately formed. Causing the opposing flanks of a tooth of the worm to engage the facing flanks of two successive teeth of the worm gear results in "double flank contact". At low- or no-load conditions, the contact between the flank surfaces is maintained at the opposing outer edges of the teeth of the worm gear. At moderate-load conditions, the contact between the flank surfaces extends from the opposing outer edges of the teeth toward the center of the teeth of the worm gear. At least one of the worm and the worm gear are fabricated from a resilient material such as a polyamide in order to allow for flexibility between the teeth of the worm and the worm gear during double flank contact. The flank surfaces of each of the teeth of the worm and the worm gear are contiguous so as to provide an uninterrupted boundary for a lubricant disposed on the assembly.

A method for delashing a gear system comprises pressing the worm into mechanical communication with the worm gear to result in double flank contact. The double flank contact is maintained at the opposing edges of each of the successive worm gear teeth and consequently the worm teeth during low- or no-load conditions and extends toward the center of each of the successive worm gear teeth and consequently the worm teeth during moderate-load conditions. The loading of the worm gear to effectuate the compressive engagement typically includes matching the worm with the worm gear to attain the most efficient combination for the optimum performance of the worm/worm gear assembly.

A method of transmitting the detections of variations in a road surface over which a motor vehicle having the worm/worm gear assembly incorporated therein includes disposing the worm in a flexible relationship with the worm gear, mounting the worm/worm gear assembly into a steering assist system, maneuvering the motor vehicle over the road surface, and sensing variations in the road surface through a steering device disposed in mechanical communication with the steering assist system.

DETAILED DESCRIPTION

Figure 1:
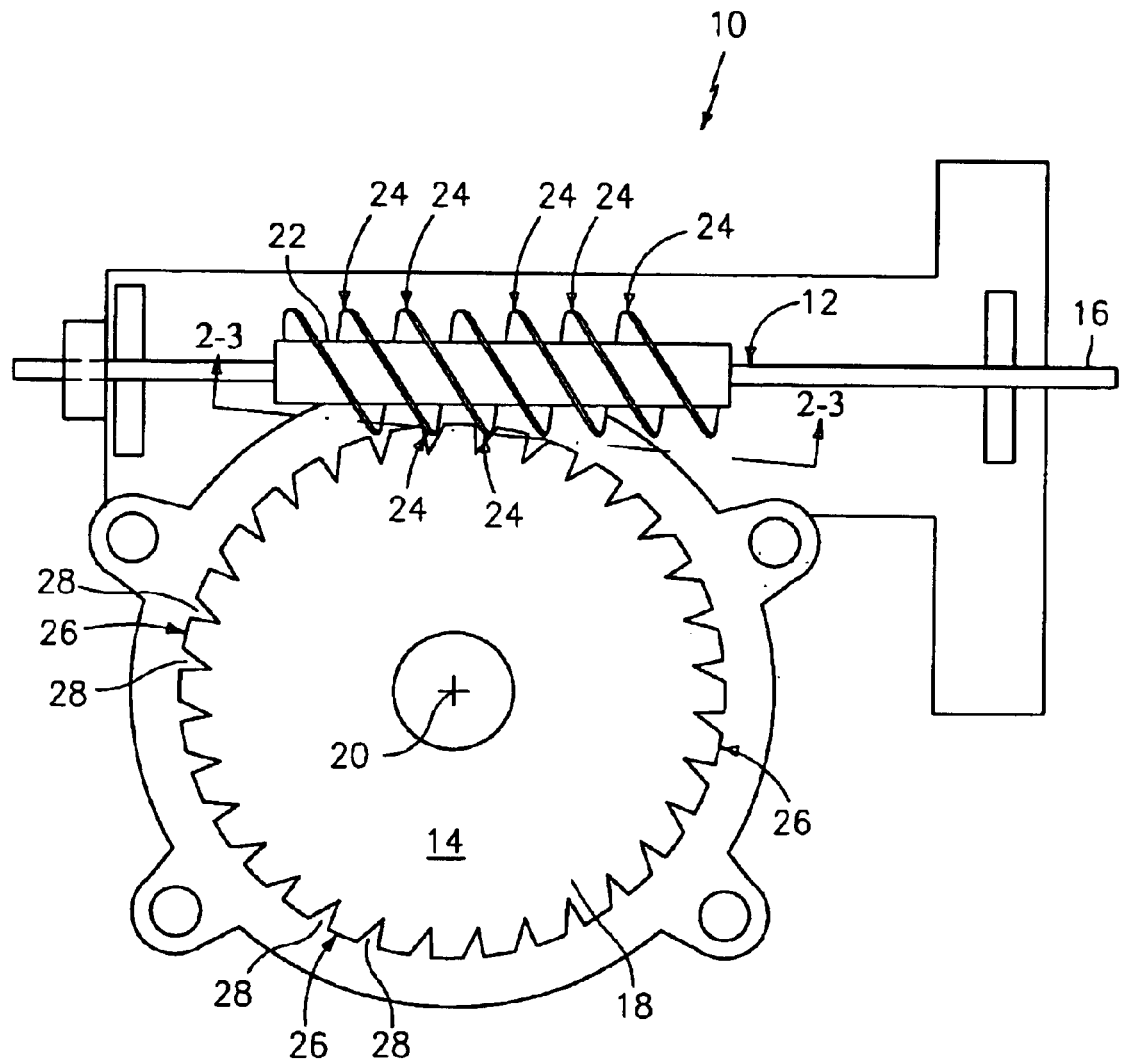
FIG. 1 is a side view of a worm/worm gear assembly in compressive engagement.

Referring to FIG. 1, a worm/worm gear assembly is shown generally at 10. Worm/worm gear assembly 10 is directionally reversible and comprises a worm, shown generally at 12, and a worm gear, shown generally at 14 disposed relative to each other such that the teeth of each (described below) are arranged in an intermeshing double flank contacting relationship. Worm 12 is supported at its ends and is mounted so as to define a longitudinal axis of rotation 16 along a length thereof. Worm gear 14 includes a body portion 18 mounted and supported at its geometric center to define an axis of rotation 20 therethrough. In worm/worm gear assembly 10, axis of rotation 20 is substantially perpendicular to axis of rotation 16.

Worm 12 includes at least one continuous thread spirally disposed about a body portion 22 to define a plurality of teeth, shown generally at 24, while worm gear 14 includes a plurality of teeth, shown generally at 26, protruding from an edge thereof to define a plurality of spaces 28. Although worm gear 14 is referred to hereinafter as being fabricated from the resilient material, it should be understood that either or both worm 12 or worm gear 14 can be fabricated from a resilient material in order to facilitate the flexing of teeth 24, 26 with respect to worm 12 or worm gear 14 during the operation of worm/worm gear assembly 10. The resilient material from which worm 12 or worm gear 14 is fabricated may be a polyamide. In particular, the resilient material may be a nylon.

Figure 2:
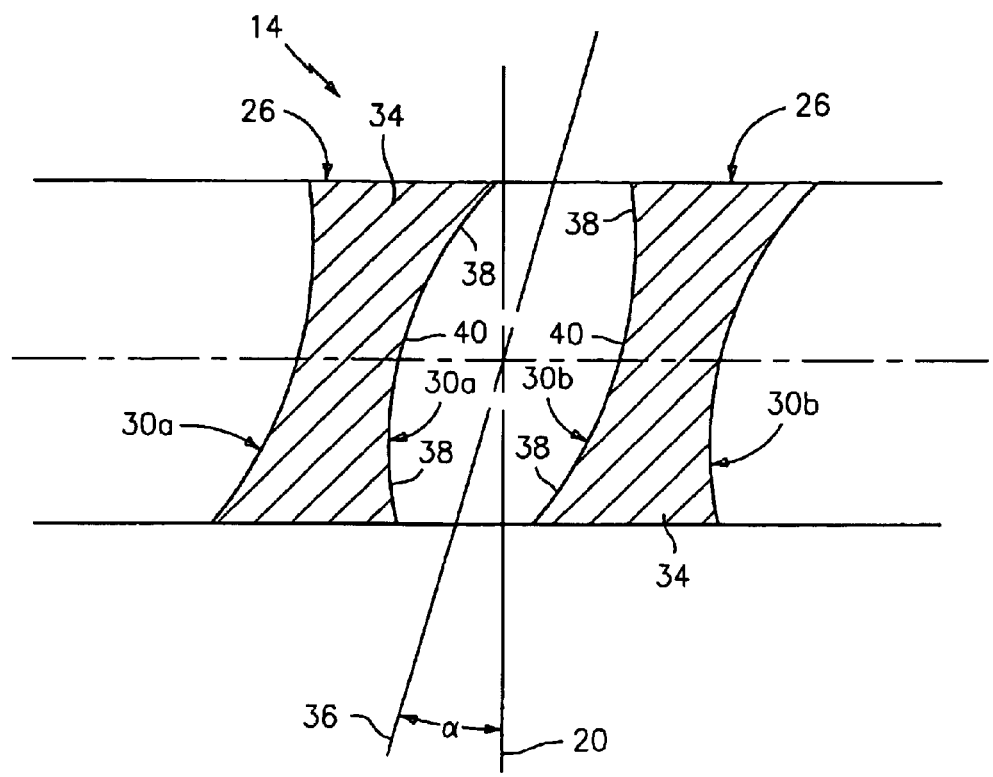
FIG. 2 is a plan view of the teeth of a worm gear and the space therebetween.

Referring now to FIG. 2, a pair of teeth 26 of worm gear 14 and space 28 defined therebetween is shown. Each tooth 26 is contiguously formed with body portion 18 and comprises opposing flanks, shown generally at 30a and 30b, extending away from body portion 18 and a crown 34 extending between flanks 30a, 30b of each tooth 26 at points most distal from body portion 18. Because worm gear 14 is created helically, a helix angle $\alpha$ is defined by the thread forming teeth 26 and body portion 18.

Each opposing flank 30a, 30b is arcuately formed and concavely oriented relative to its corresponding tooth 26. The surface of each flank 30a, 30b is uninterrupted and comprises outboard portions 38 (first location) and a center portion 40 (second location) disposed intermediate outboard portions 38. Outboard portions 38 correspond with the portions of flanks 30a, 30b positioned at the outer edges of worm gear 14 and serve as contact surfaces for the flanks of the teeth of the worm when worm gear 14 is engaged by the worm.

Figure 3:
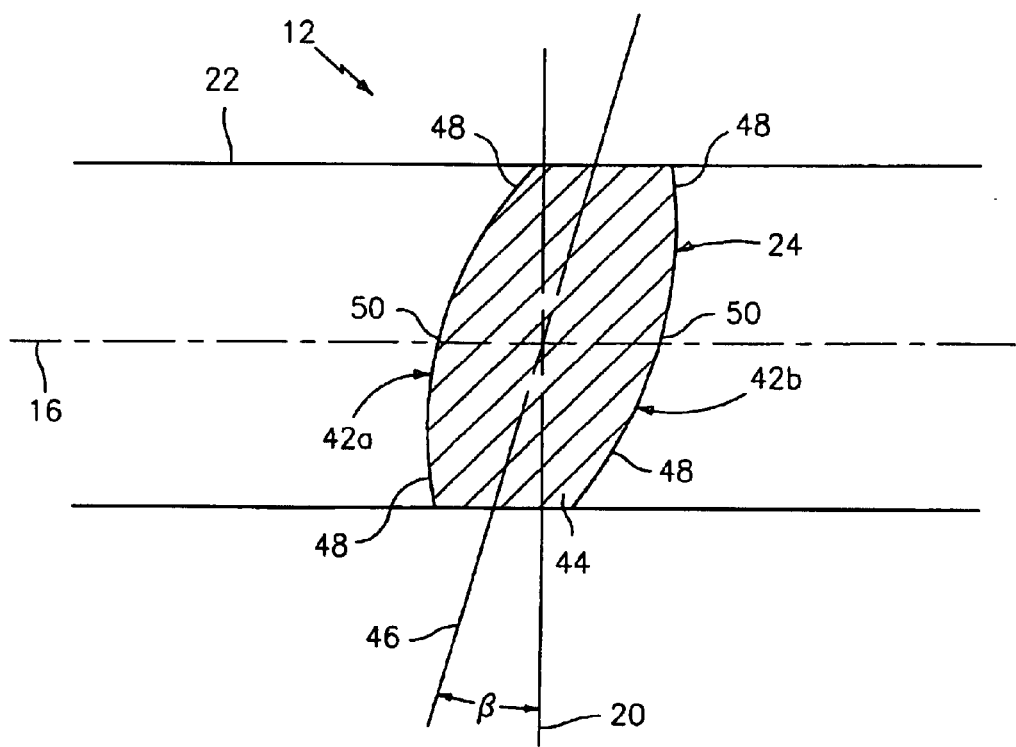
FIG. 3 is a plan view of a tooth of a worm engaged with a worm gear.

Referring to FIG. 3, tooth 24 of worm 12 is shown. Tooth 24, like the teeth of the worm gear, is contiguously formed with body portion 22 and comprises opposing flanks, shown generally at 42a and 42b, extending away from body portion 22 and a crown 44 extending between each flank 42a, 42b at points distal from body portion 22. Because worm 12 is created helically, a helix angle $\beta$ is defined between the thread forming teeth 24 and body portion 22. The lead angle $\beta$ of the worm, which is less than the helix angle of the worm gear so that a gap is defined between the teeth of the worm gear and tooth 24 of worm 12 when worm 12 and the worm gear intermesh in order to force the teeth of worm 12 to outboard portions 38 of teeth 26.

Each opposing flank 42a, 42b is arcuately formed and convexly oriented relative to its corresponding tooth 24. In a manner similar to that of the worm gear, the surface of each flank 42a, 42b is uninterrupted and comprises outboard portions 48 and a center portion 50 disposed intermediate outboard portions 48. Outboard portions 48 correspond with the portions of flanks 42a, 42b positioned at the outer edges of worm 12 and serve as contact surfaces for the flanks of the teeth of the worm gear when worm 12 compressively engages the worm gear.

Referring to FIGS. 1, 2, and 3, worm/worm gear assembly 10 is delashed when both worm 12 and worm gear 14 are properly compressively engaged with each other. During proper compressive engagement, which is typically about 50 microns to about 100 microns, teeth 26 of worm 14 are flexible relative to teeth 24 of worm 12. This flexibility is a function of the resiliency defined by the nature of the material of fabrication of worm gear 14 and the spring rate associated with tooth 26. The spring rate, in turn, is a function of the architecture of tooth 26, which may be defined at least in part by the concavity of flanks 30a, 30b and the helical orientation of the thread. The particular geometries involved cause the spring rate to be variable, increasing and decreasing in smooth manners upon deflection of tooth 26. Because of such flexibility, contact is maintainable between outboard portions 48 of teeth 24 of worm 12 and outboard portions 38 of teeth 26 of worm gear 14 at low- or no-load conditions without binding. Such contact is hereinafter referred to as "double flank" contact. Although double flank contact would normally result in the jamming or binding of the gears when both gears are fabricated of metal or some other substantially inflexible material, double flank contact in worm/worm gear assembly 10, because of the resiliency of the material of fabrication and spring rate of tooth 26 itself, allows worm/worm gear assembly 10 to function without jamming or binding.

By maintaining double flank contact at low- or no-load conditions, worm/worm gear assembly 10 can be operated so as to effectively eliminate audible noise and feedback due to a reversal of the rotation of worm 12 to drive worm gear 14 in an opposing direction. In worm/worm gear assembly 10, such an operation does not necessitate the contact of two non-contacting teeth, which would otherwise generate noise. Without double flank contact, a reversal of the rotation of worm 12 to drive worm gear 14 in an opposing direction causes the worm teeth to move through the backlash space and then contact an opposing flank surface of worm gear 14 to result in an audible noise and distortional feedback being transmitted to the operator of the motor vehicle through the steering device. Any distortional feedback, which is essentially a "shock load" imposed on the system, excites all frequencies of the system and is, therefore, magnified. The variability of the spring rate discussed above and due to the material of fabrication and tooth architecture acts as a shock absorber and makes the distortional feedback transparent to the operator. Additionally, the flexibility of the material allows only a minimum amount of turning torque to exist within worm/worm gear assembly 10, which in turn allows the road feel to be sensed by the operator of the motor vehicle.

One manner of maintaining the double flank contact between teeth 24, 26 of worm/worm gear assembly 10 can be achieved through the alteration of angles α, β of worm 12 and worm gear 14. Such alteration of angles α, β allows for contact to be maintained on facing flanks of teeth 26 of worm gear 14 when no additional torsional load is imposed on worm/worm gear assembly 10. Alteration of angles α, β can be attained by changing the dimensions and positioning of teeth 24, 26, or it can be attained by skewing axes of rotation 16, 20 of either or both of worm 12 and worm gear 14 shown generally at 46 and 36, respectively. The resulting double flank contact allows for a smooth power transmission between worm 12 and worm gear 14, a smooth transition between spring rates, and a minimum amount of turning torque.

Regardless of the manner of maintaining the double flank contact between teeth 24, 26, the architecture and material construction of worm gear 14 is such that as the load exerted thereon is increased and deflection of the contact area of each engaged tooth increases, the spring rate of worm gear 14 smoothly increases. The load on teeth 26 is imparted thereto through either flank 30a or flank 30b. The geometry of teeth 26 allows teeth 26 to be structurally flexible with an increasing spring rate proportional to the deflection. Under low- or no-load conditions, the double flank contact is maintained solely at outboard portions 38 of flanks 30a, 30b. Teeth 26 are substantially flexible near the low- and no-load contact areas because the spring rate is low at low deflection angles. Under moderate-load conditions, the spring rate increases due to higher deflection and the limits of the flexibility of teeth 26 are approached. The higher spring rate enables the gear to carry the higher applied load, and the smooth transition avoids noise and undesirable feedback in the hand steering device. In addition to the higher spring rate of the material of worm gear 14 with higher deflection, the area of contact expands in order to assist in carrying the higher load.

Figure 4A:
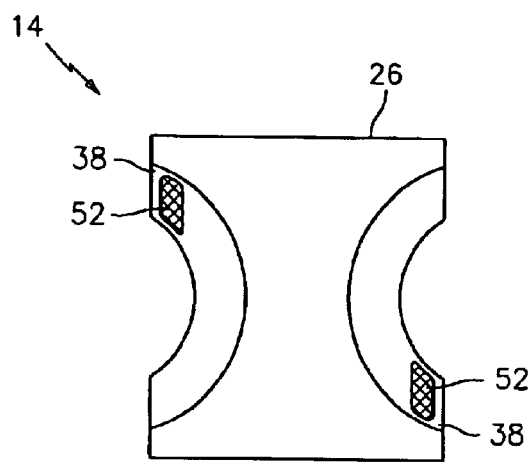
FIG. 4A is a plan view of a tooth of a worm gear showing a contact patch resulting from a no- or low-load condition imposed thereon.
Figure 4B:
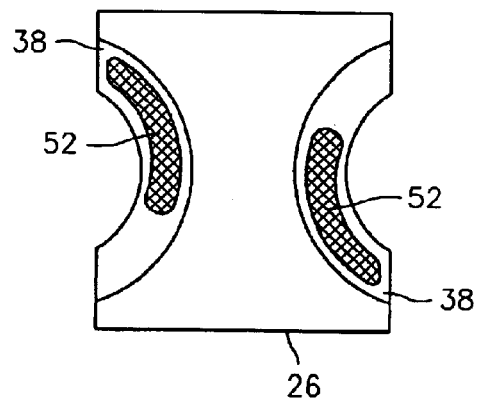
FIG. 4B is a plan view of a tooth of a worm gear showing a contact patch resulting from a moderate-load condition imposed thereon.

Referring now to FIGS. 4A and 4B, the contact pattern between teeth 24 of worm 12 and teeth 26 of worm gear 14 is illustrated under the various load conditions. In FIG. 4A, points of contact between the teeth of the worm and tooth 26 of worm gear 14 are shown as contact patterns 52. The degree of flexibility of tooth 26 enables contact patterns 52 to be established. During low- or no-load conditions, two teeth of the worm engage tooth 26 of worm gear 14 only at two opposing outboard portions 38 of tooth 26. Successive teeth of worm gear 14 are similarly engaged by two successive teeth of the worm to maintain the double flank contact. As stated above, during a reversal of the direction of the worm/worm gear assembly and under a low-or no-load condition, because contact is maintained between successive teeth of the worm and worm gear 14, the teeth of the worm do not collide with teeth 26 of worm gear 14; they are already in contact with one another.

In FIG. 4B, contact patterns 52 extend from the two opposing outboard portions 38 of tooth 26 of worm gear 14 to the innermost portions of tooth 26 of worm gear 14 and are indicative of the operation of the worm/worm gear assembly under a moderate-load condition. It should be noted that the flank surfaces are uninterrupted and continuous so that the transfer from outboard contact only to more inboard contact is achieved without noise and feedback associated with interrupted or multiple surfaces. In such a condition, successive teeth of worm gear 14 are similarly engaged or "pinched" by two successive teeth of the worm to maintain the double flank contact. Because the moderate loading of the worm/worm gear assembly increases the load exerted on the worm and worm gear 14, contact patterns 52 extend from the outermost edges of outboard portions 38 toward center portions 50. However, under the moderate-load condition, successive teeth of worm gear 14 may be engaged solely on a single flank thereof, thereby maintaining single flank contact between the worm and worm gear 14. During a reversal of the direction of the worm/worm gear assembly under moderate loading in which only single flank contact is maintained, because double flank contact is not maintained between successive teeth of the worm and worm gear 14, the teeth of the worm collide with teeth 26 of worm gear 14 to produce an audible noise.

By causing double flank contact to occur in a gear set having at least one gear manufactured of a resilient material in conjunction with the gear geometries disclosed herein, turning torque is kept to a minimum, rattle within the worm/worm gear assembly is minimized, and the gear set is audibly quiet. By delivering all three attributes, performance of a gear set is enhanced and significant benefit to the art is provided.

It should be noted that although the worm/worm gear assembly has been described to carry no-load or low-load situations outboard on the worm and worm gear teeth, it is possible to construct a double flank contact system having a resilient material gear where low- or no-load situations are carried at the center (first location) of the worm and worm gear teeth with higher load situations being carried outboard (second location). In order to accomplish the desired goals of low turning torque, no rattle, and no noise in such a system, the center area of each tooth on the worm and worm gear would have an initially lower spring rate which increases with deflection, and the outboard section would have the higher spring rate (also increasing with deflection).

Figure 5:
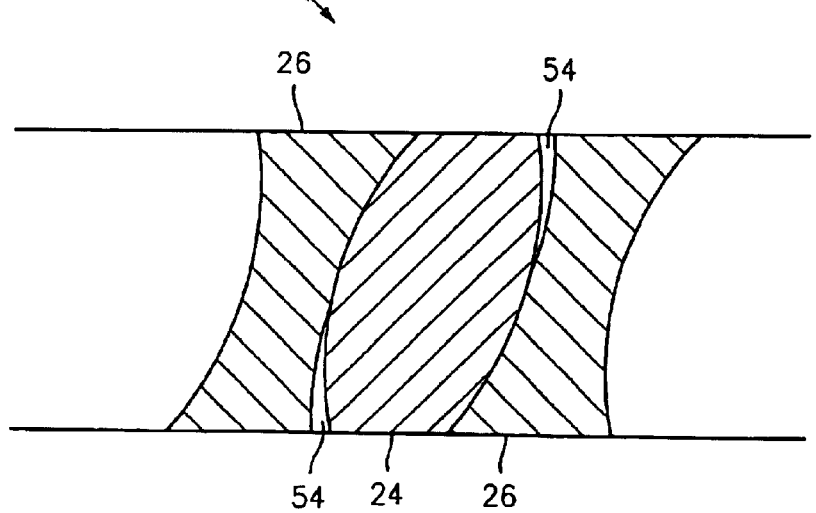
FIG. 5 is a plan view of a tooth of a worm disposed between successive teeth of a worm gear.

Referring now to FIG. 5, worm/worm gear assembly 10 can be lubricated in such a manner so as to ensure smooth operation of worm/worm gear assembly 10, thereby ensuring the longevity of the parts involved. In particular, during a no-load condition, a gap 54 is defined between the outboard flanks of teeth 24, 26 of the worm and the worm gear due to the particular geometry of worm/worm gear assembly 10 and in particular the difference between the lead and helix angles of teeth 24 of the worm and teeth 26 of the worm gear, respectively. Gap 54 is variably dimensioned to accommodate a lubricant (not shown) therein, the surface tension of which prevents the leakage of the lubricant from gap 54 except during periods of loading. During such periods of loading, a compressive force is applied to the flanks of teeth 24, 26, and the lubricant is squeezed out of gap 54 to a degree that corresponds with the compressive force of the loading. After being squeezed from gap 54, a thin film of the lubricant, the thickness of which is variable depending upon the force of compression, remains on each flank to lubricate teeth 24, 26, thereby reducing the friction therebetween. Upon the release of the compressive force, the volume defined by gap 54 increases and the pressure therein decreases to siphon lubricant that was previously squeezed out of gap 54 back into space 54.

While preferred embodiments have been shown and described, various modifications and substitutions may be made thereto without departing from the spirit and scope of the invention, including the use of the geometries taught in other conventional worm/worm gear assemblies. Accordingly, it is to be understood that the apparatus and method have been described by way of illustration only, and such illustrations and embodiments as have been disclosed herein are not to be construed as limiting to the claims.

Figure 6:
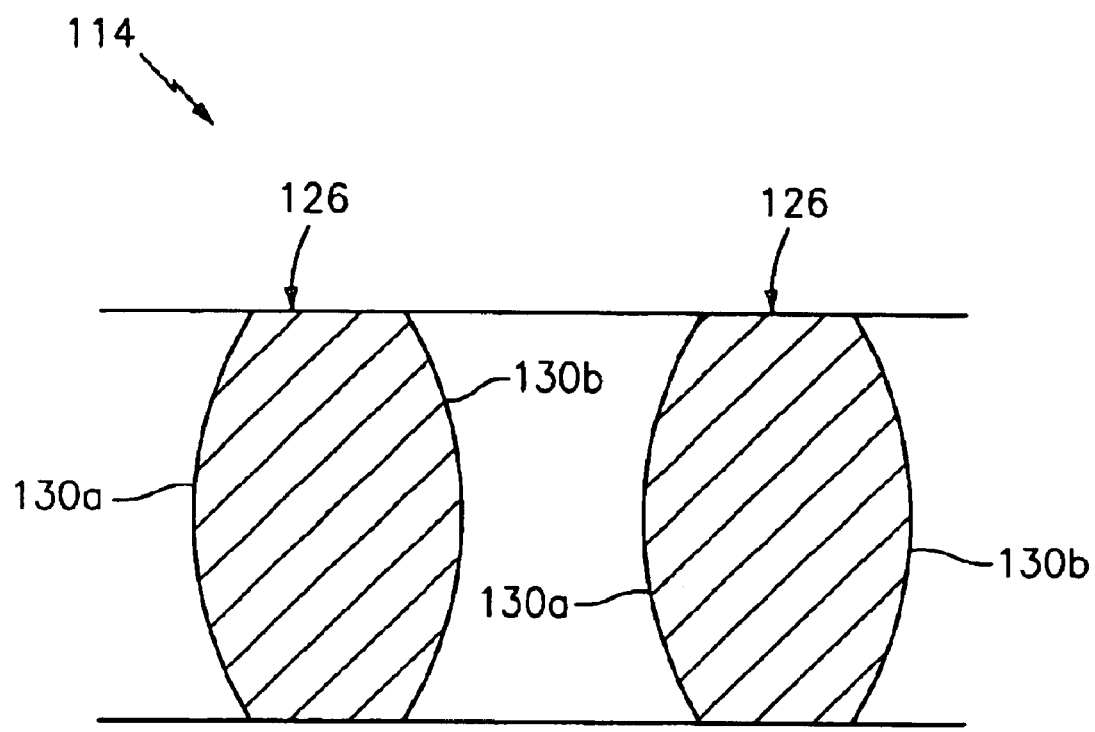
FIG. 6 is a schematic view of an alternate embodiment of a tooth of a worm.

Although the worm gear is hereinbefore described as comprising teeth having flanks that are arcuately formed and concavely oriented relative to the corresponding tooth, it should be understood that the worm gear may be defined by teeth having flanks that are arcuately formed and convexly oriented relative to the corresponding tooth, as is shown at 114 with reference to FIG. 6. Such a worm gear 114 comprises worm gear teeth 126 that are convexly oriented to mesh with teeth of a corresponding worm (not shown). Each tooth 126 comprises opposing flanks, shown at 130*a* and 130*b*, extending away from a body portion 118 and a crown 134 extending between flanks 130*a*, 130*b*. Each opposing flank 130*a*, 130*b* is arcuately formed and convexly oriented relative to its corresponding tooth 126.

What is claimed is:

1. A worm/worm gear assembly, comprising:
   a worm having a plurality of teeth defined by at least one thread disposed thereon, wherein flank surfaces of each of said teeth of said worm are convexly arcuately formed; and
   a single part worm gear having a plurality of uninterrupted teeth flexibly disposed thereon, said teeth of said worm gear being disposed in outboard mechanical double flank communication with said teeth of said worm,
   wherein a lead angle of said worm is less than a helix angle of said worm gear.

2. The worm/worm gear assembly of claim 1 wherein each of said teeth of the worm includes a first flank surface and an opposing second flank surface, and wherein each of said teeth of said worm gear includes a first flank surface and an opposing second flank surface, said outboard mechanical double flank communication being maintained such that contact is made between said first flank surface of at least one of said teeth of said worm and said first flank surface of at least one of said teeth of said worm gear, and such that contact is made between said opposing second flank surface of said at least one of said teeth of said worm and a flank surface facing said first flank surface of said at least one tooth of said worm gear on a successive tooth of said worm gear.

3. The worm/worm gear assembly of claim 2 wherein the contact made between said first flank surface of at least one of said teeth of said worm and said first flank surface of at least one of said teeth of said worm gear is at opposing outer edges of said worm and said worm gear, and wherein the contact made between said opposing second flank of said at least one of said teeth of said worm and said flank surface facing said first flank surface of said at least one tooth of said worm gear on said successive tooth of said worm gear is at said opposing outer edges of said worm and said worm gear.

4. The worm/worm gear assembly of claim 2 wherein a compressive relationship is maintained between said worm and said worm gear.

5. The worm/worm gear assembly of claim 2 wherein said lead angle of said worm is skewed relative to said helix angle of said worm gear.

6. The worm/worm gear assembly of claim 2 wherein an axis of rotation of said worm gear is skewed relative to an axis of rotation of said worm.

7. The worm/worm gear assembly of claim 2 wherein the contact maintained between said first flank surface of at least one of said teeth of said worm and said first flank surface of at least one of said teeth of said worm gear extends from opposing outer edges of said worm and said worm gear to a point intermediate opposing outer edges of said worm and said worm gear, and wherein the contact maintained between said opposing second flank of said at least one of said teeth of said worm and said flank surface facing said first flank surface of said at least one tooth of said worm gear on said successive tooth of said worm gear extends from opposing outer edges of said worm and said worm gear to a point intermediate said opposing outer edges of said worm and said worm gear.

8. The worm/worm gear assembly of claim 7 wherein said flank surfaces of each of said teeth of said worm gear are concavely arcuately formed to substantially correspond with said flank surfaces of each of said teeth of said worm.

9. The worm/worm gear assembly of claim 7 wherein said lead angle of said worm is less than said helix angle of said worm gear by about 0.5 degrees to about 2.0 degrees.

10. The worm/worm gear assembly of claim 7 wherein a compressive relationship is maintained between said worm and said worm gear.

11. The worm/worm gear assembly of claim 7 wherein said lead angle of said worm is skewed relative to said helix angle of said worm gear.

12. The worm/worm gear assembly of claim 7 wherein an axis of rotation of said worm gear is skewed relative to an axis of rotation of said worm.

13. The worm/worm gear assembly of claim 7 wherein at least one of said worm and said worm gear are fabricated from a resilient material.

14. The worm/worm gear assembly of claim 7 wherein said worm/worm gear assembly is reversibly operable.

15. The worm/worm gear assembly of claim 1 wherein said flank surfaces of each of said teeth of said worm gear are concavely arcuately formed to substantially correspond with said convexly arcuately formed flank surfaces of each of said teeth of said worm.

16. The worm/worm gear assembly of claim 1 wherein said lead angle of said worm is less than said helix angle of said worm gear by about 0.5 degrees to about 2.0 degrees.

17. The worm/worm gear assembly of claim 1 wherein at least one of said worm and said worm gear are fabricated from a resilient material.

18. A worm/worm gear assembly, comprising:
    a worm having gear teeth, wherein flank surfaces of each of said gear teeth of said worm are convexly arcuately formed; and
    a worm gear maintained in double flank contact with said worm and wherein a no-load or a low-load condition is carried at a low spring rate and a higher load condition is carried at a higher spring rate.

19. The worm/worm gear assembly of claim 18 further comprising lower load contact areas in first locations on gear teeth of said worm and said worm gear and higher load contact areas at second locations on gear teeth of said worm and said worm gear, said first location and said second location being located on a single surface of each of said gear teeth.

20. The worm/worm gear assembly of claim 18 wherein said spring rate increases as said load increases, said spring rate increasing in proportion to a deflection of teeth of said worm gear.

21. The worm/worm gear assembly of claim 18 wherein said worm and said worm gear each include a plurality of teeth, each of said teeth including a first flank surface and an opposing second flank surface, and wherein mechanical communication is maintained such that contact is made between said first flank surface of at least one of said teeth of said worm gear and said first flank surface of at least one of said teeth of said worm, and such that contact is made between said opposing second flank surface of said at least one of said teeth of said worm and a flank surface facing said first flank surface of said at least one tooth of said worm gear on a successive tooth of said worm gear.

22. A single part gear capable of reducing backlash, comprising: a plurality of teeth disposed on an outer edge thereof, each tooth of said plurality of teeth having two arcuately-formed flank surfaces, said flank surfaces being arcuately-formed across a width of each tooth of said gear, said gear being efficiently operable under load conditions, and said gear being configured to be run in double flank contact with a worm, wherein said arcuately-formed flank surfaces are convex relative to said tooth.

23. The gear of claim 22 wherein a first of said arcuately-formed flank surfaces on said tooth of said gear is configured and positionable to engage a first flank surface of a tooth on a mating gear, and wherein a first arcuately-formed facing flank surface on a successive tooth of said gear is configured and positionable to engage a second opposing flank surface of a tooth on said mating gear that is successive to said first tooth on said mating gear.

24. The gear of claim 22 wherein each of said arcuately-formed flank surfaces is uninterrupted.

25. An operable worm gear efficient at no- or low-load conditions and at higher load conditions such that double flank meshing contact is maintained between said operable worm gear and a worm to eliminate backlash between said operable worm gear and said worm, said operable worm gear comprising:
a body portion; and
a plurality of teeth disposed on said body portion, each tooth of said plurality of teeth being formed of a resilient material, wherein said each tooth is concavely-formed relative to said each tooth of said plurality of teeth, wherein said plurality of teeth are flexibly disposed on said body portion, each tooth of said plurality of teeth has a spring rate associated therewith, said spring rate increasing with increasing deflection of each tooth of said plurality of teeth.

26. The operable worm gear of claim 25 wherein each tooth of said plurality of teeth includes continuous flank surfaces.

27. The operable worm gear of claim 25 wherein said spring rate is variably dependent upon at least one of a helical angle of a helical thread forming said plurality of teeth and the concavity of each of said teeth of said plurality of teeth.

28. A worm/worm gear assembly, comprising:
a worm; and
a worm gear, said worm gear being engaged in double flank contact with said worm, teeth of one of said worm and said worm gear are concavely-formed relative to each tooth of a plurality of teeth defining said one of said worm and said worm gear such that a first contact area between a tooth of said worm and a tooth of said worm gear is smaller in size at a low load condition than a second contact area is at a higher load condition, and such that said first contact area at said low-load condition increases to form said second contact area at said higher load condition, wherein a lead angle of said worm is less than a helix angle of said worm gear.

29. A worm/worm gear assembly, comprising:
a worm having at least one helical tooth, wherein flank surfaces of each of said at least one helical tooth is convexly arcuately formed; and
a flexible helical cut worm gear, in double flank contact with said worm, and wherein a lead angle of said worm helical tooth is less than a helix angle of said helical cut worm gear.

30. A method of delashing a gear system, comprising:
disposing a worm in compressive mechanical communication with a worm gear, wherein flank surfaces of each tooth of a plurality of teeth on said worm gear are concavely arcuately formed relative to each tooth of a plurality of teeth defining said worm gear; and
maintaining double flank contact at opposing edges of facing successive worm gear teeth such that during low- or no-load conditions, said double flank contact is maintained between teeth of said worm and said worm gear at outer edges of each of said facing successive worm gear teeth and during higher load conditions said double flank contact extends toward the center of each of said facing successive worm gear teeth, wherein said disposing of said worm in compressive mechanical communication with said worm gear comprises biasing said worm and said worm gear together and skewing a helix angle of said worm gear.

31. A method of delashing a gear system, comprising:
disposing a worm in compressive mechanical communication with a worm gear, wherein flank surfaces of each tooth of a plurality of teeth on said worm gear are concavely arcuately formed relative to each tooth of a plurality of teeth defining said worm gear; and
maintaining double flank contact at opposing edges of facing successive worm gear teeth such that during low- or no-load conditions, said double flank contact is maintained between teeth of said worm and said worm gear at outer edges of each of said facing successive worm gear teeth and during higher load conditions said double flank contact extends toward the center of each of said facing successive worm gear teeth, wherein said disposing of said worm in compressive mechanical communication with said worm gear comprises biasing said worm and said worm gear together and skewing an axis of said worm gear relative to an axis of said worm.

32. A worm/worm gear assembly, comprising:
a worm having a plurality of teeth defined by at least one thread disposed thereon, each of said teeth of said worm including a first flank surface and an opposing second flank surface, wherein said flank surfaces of each of said teeth of said worm are convexly arcuately formed; and
a single part worm gear having a plurality of uninterrupted teeth flexibly disposed thereon, said teeth of said worm gear being disposed in outboard mechanical double flank communication with said teeth of said worm, each of said teeth of said worm gear including a first flank surface and an opposing second flank surface, said flank surfaces of said worm gear being concavely arcuately formed, said mechanical communication being maintained such that contact between said teeth of said worm and said worm gear is maintained at opposing outer edges of said teeth and extends to a point intermediate said opposing outer edges of said teeth, wherein a lead angle of said worm is less than a helix angle of said worm gear.

* * * * *